United States Patent
Mueller

(10) Patent No.: US 7,180,935 B2
(45) Date of Patent: Feb. 20, 2007

(54) SYSTEM AND METHOD FOR COMPENSATING FOR DELAY TIME FLUCTUATIONS

(75) Inventor: Horst Mueller, Hohenschaeftlarn (DE)

(73) Assignee: Siemens Aktiengesellschaft, Munich (DE)

( * ) Notice: Subject to any disclaimer, the term of this patent is extended or adjusted under 35 U.S.C. 154(b) by 789 days.

(21) Appl. No.: 10/126,382

(22) Filed: Apr. 18, 2002

(65) Prior Publication Data

US 2002/0154707 A1   Oct. 24, 2002

(30) Foreign Application Priority Data

Apr. 19, 2001   (DE) ................. 101 19 202

(51) Int. Cl.
  H04B 1/38   (2006.01)
  H04B 3/00   (2006.01)
  H04L 7/00   (2006.01)
(52) U.S. Cl. ............... 375/221; 375/219; 375/257; 375/358
(58) Field of Classification Search ............ 370/419, 370/100; 395/432; 455/226; 375/346, 295, 375/219, 220, 259, 354, 356, 358, 257, 221; 713/400, 600; 327/155
See application file for complete search history.

(56) References Cited

U.S. PATENT DOCUMENTS

| | | | | |
|---|---|---|---|---|
| 4,485,470 A | * | 11/1984 | Reali ...................... 370/537 |
| 5,416,861 A | * | 5/1995 | Koh et al. .................... 385/14 |
| 5,586,286 A | * | 12/1996 | Santeler et al. ............. 711/105 |
| 5,680,596 A | * | 10/1997 | Iizuka et al. ................ 713/600 |
| 5,737,633 A | * | 4/1998 | Suzuki ........................ 710/29 |
| 5,881,135 A | * | 3/1999 | Watts et al. .............. 379/88.02 |
| 5,995,512 A | * | 11/1999 | Pogue, Jr. .................. 370/419 |
| 6,084,934 A | * | 7/2000 | Garcia et al. ............... 375/370 |
| 6,167,077 A | | 12/2000 | Ducaruir et al. |
| 6,275,549 B1 | * | 8/2001 | Greatwood et al. ......... 375/356 |
| 6,369,627 B1 | * | 4/2002 | Tomita ....................... 327/158 |
| 6,385,263 B1 | * | 5/2002 | Bowers et al. .............. 375/356 |
| 6,421,754 B1 | * | 7/2002 | Kau et al. ................... 710/261 |
| 6,438,178 B1 | * | 8/2002 | Lysdal et al. ............... 375/317 |
| 6,826,390 B1 | * | 11/2004 | Tamura ................... 455/226.1 |

* cited by examiner

Primary Examiner—Betsy L. Deppe
(74) Attorney, Agent, or Firm—Bell, Boyd & Lloyd LLP

(57) ABSTRACT

A method is provided for time control of data transmission from a first module to a further module. An electronic system also is provided having a first module from which data is sent via a connecting line to a further module, which has a reference signal line via which a reference signal is transmitted from the further module to the first module, which reference signal is chosen as a function of the timing of the data received by the further module, with respect to a clock signal received by the further module. The reference signal has a bit sequence which corresponds to a bit sequence which was received by the further module via the connecting line from the first module.

18 Claims, 6 Drawing Sheets

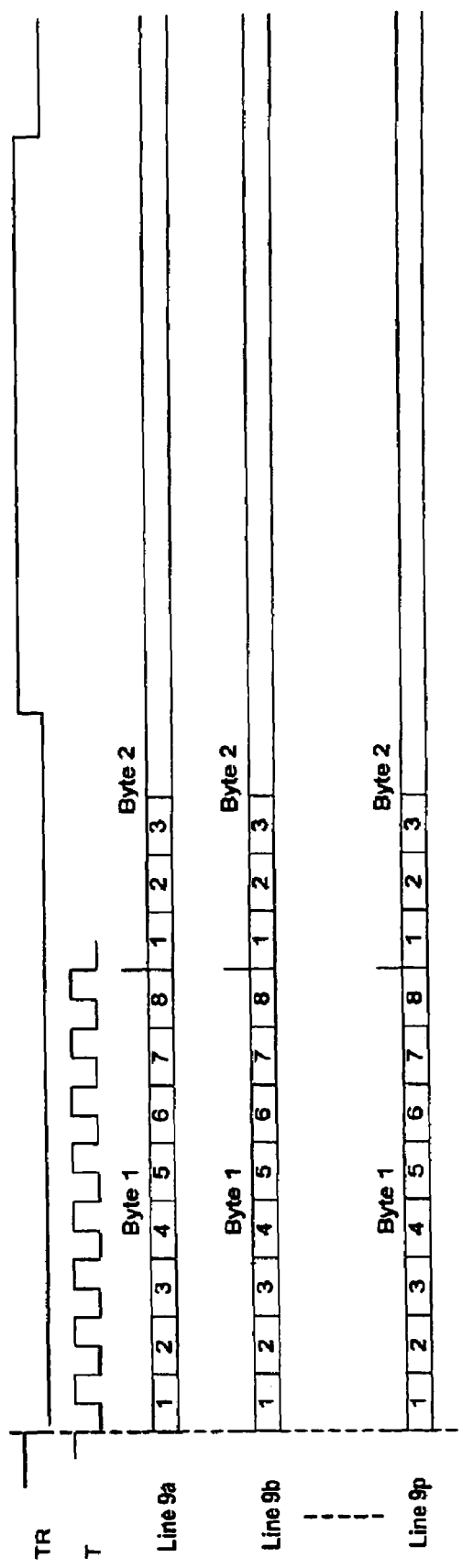
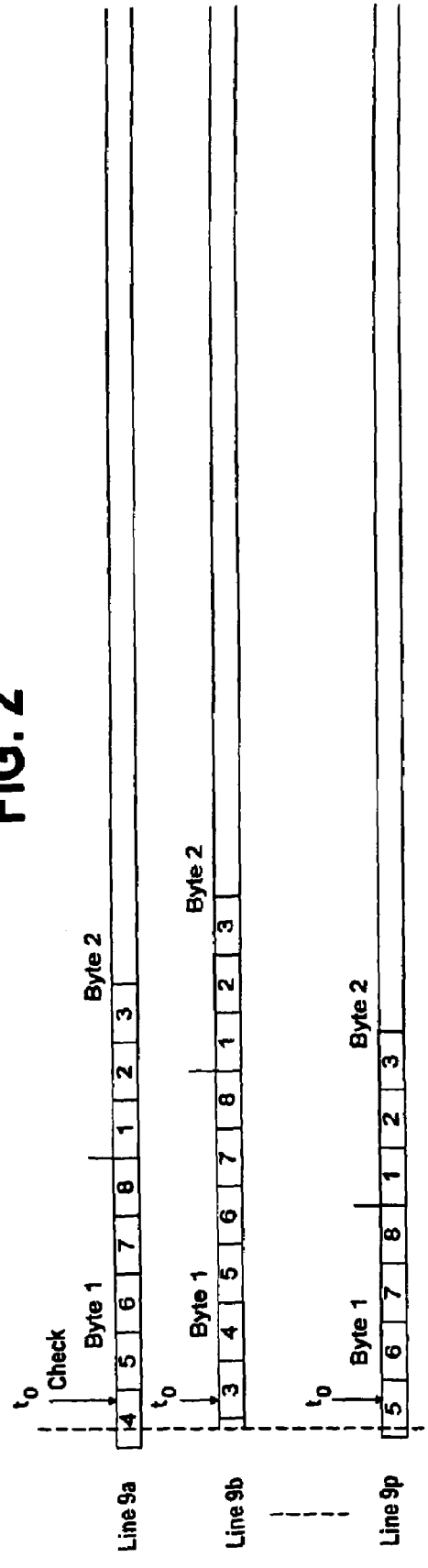

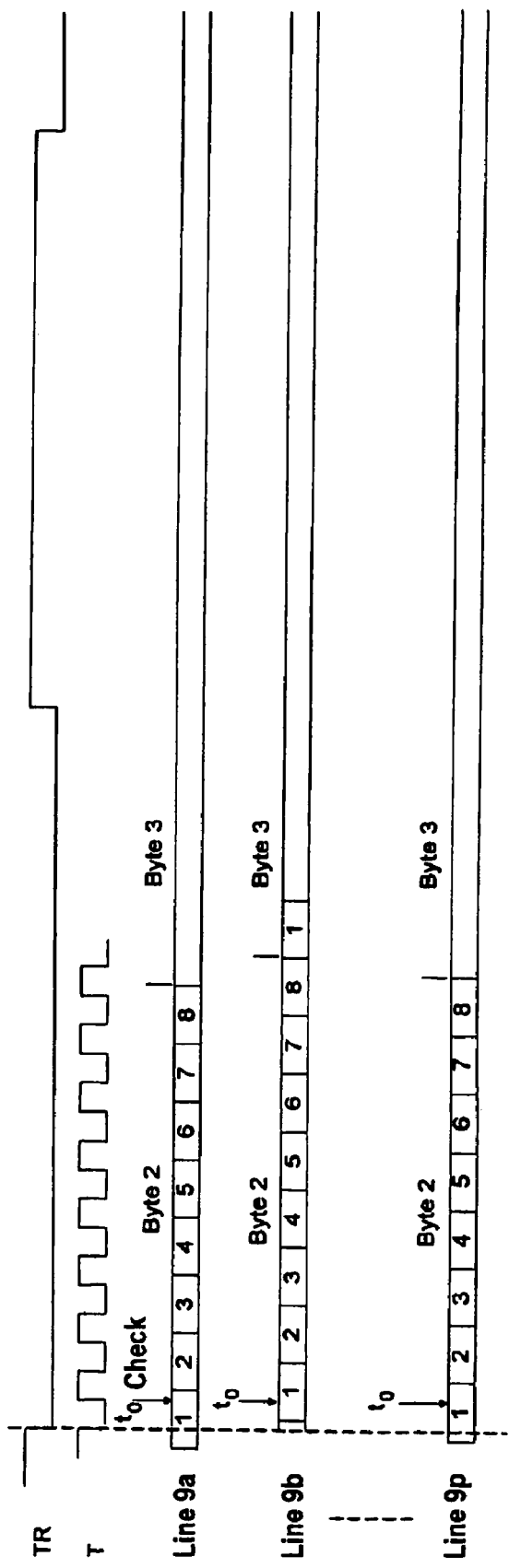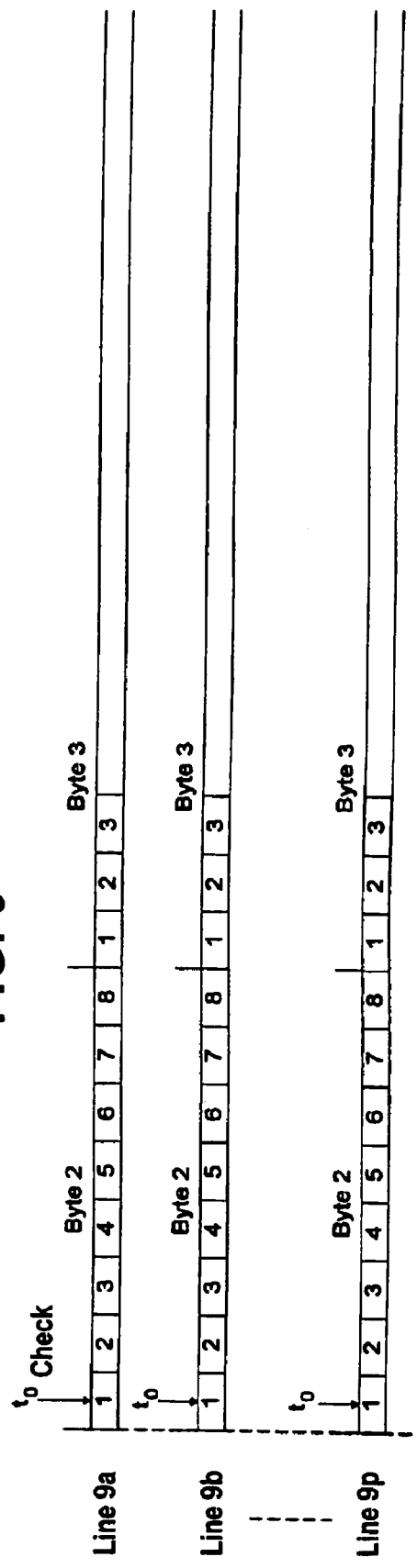

SYSTEM AND METHOD FOR COMPENSATING FOR DELAY TIME FLUCTUATIONS

BACKGROUND OF THE INVENTION

The present invention relates to an electronic system having a first module, from which data is sent via a connecting line to a further module. The present invention also relates to a method for time control of the data transmission from a first module to a further module.

Electronic systems having a number of electronic modules, such as integrated circuits, frequently have to be able to process data at a relatively high speed. This applies, in particular, to systems which are used in optical message networks where high data transmission rates are used.

In order to achieve a high data processing speed, a signal which is received by the system can be split into a number of subsignals, which are processed in parallel, in appropriate modules.

If the subsignals are then transmitted from one module via a number of connecting lines in a parallel manner to a further module, the subsignals can arrive at the further module at respectively different times. This is due, for example, to different delay times on the various connecting lines.

This is particularly true when the delay times on the connecting lines are in the same order of magnitude as the clock period duration of the transmitted data bits.

For example, if there is a length difference of 10 cm between two different connecting lines and the clock frequency that is used is, for example, 2.5 GHz, this leads to a delay time difference of approximately 700 ps, which corresponds virtually to two clock periods.

An object of the present invention is, therefore, to provide a novel method for time control of the data transmission from a first module to a further module, as well as a novel electronic system having a first module from which data is transmitted via a connecting line to a further module, and in which the delay time differences that occur during the data transmission are reduced.

SUMMARY OF THE INVENTION

Thus, according to the present invention, an electronic system is provided having a first module from which data is sent via a connecting line to a further module, wherein the system has a reference signal line via which a reference signal is transmitted from the further module to the first module, which reference signal is selected as a function of the timing of the data received by the further module, with respect to a clock signal received by the further module.

The transmission of data by the first module then can be delayed, or speeded up, as a function of the reference signal received by the first module, so that the received data can be checked with respect to the respectively correct times in the further module.

Since the delay or speeding up of the transmission of the transmission signals is essentially controlled by the first module, the further module, which receives the transmission data, can be produced with relatively little circuitry complexity.

It is particularly preferable, in addition to the above-mentioned connecting line, for the system to have one or more further connecting lines, via which further data is sent from the first module in a parallel manner to the further module. The reference signal is advantageously selected as a function of the timing of the data received by the further module via the connecting line, and the further data received by the further module via the further connecting lines or number of further connecting lines, with respect to the clock signal received by the further module.

If the transmission of data or of further data via the connecting line or via the further connecting lines or number of further connecting lines is delayed or speeded up appropriately by the first module as a function of the reference signal, it is possible for the received data and the received further data to be checked in the further module with respect to essentially identical times in each case. This makes it possible to compensate for delay time fluctuations.

Additional features and advantages of the present invention are described in, and will be apparent from, the following Detailed Description of the Invention and the Figures.

BRIEF DESCRIPTION OF THE FIGURES

FIG. 2 shows a timing diagram of the transmission signals sent by the first electronic module illustrated in FIG. 1, as well as the clock signals received by this module.

FIG. 3 shows a timing diagram of the transmission signals received by the fourth electronic module, illustrated in FIG. 1, from the first electronic module.

FIG. 6 shows a timing diagram of the bit-delayed transmission signals received by the fourth electronic module, illustrated in FIG. 1, from the first electronic module, as well as the clock signals received by the fourth electronic module.

FIG. 9 shows a timing diagram of the transmission signals received by the fourth electronic module, illustrated in FIG. 1, from the first electronic module, after the fine adjustment of the transmission signal delay.

DETAILED DESCRIPTION OF THE INVENTION

Figure 1:
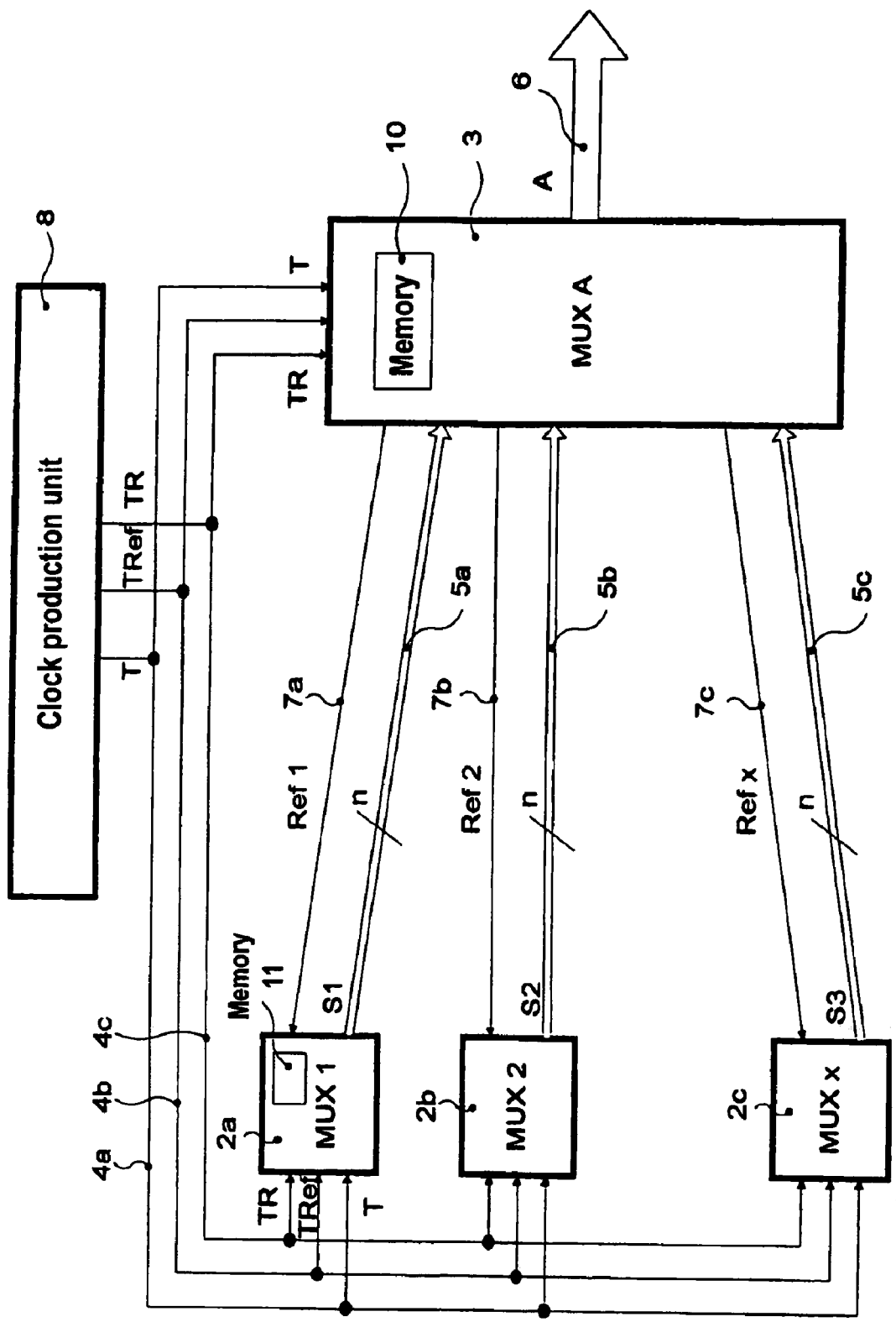
FIG. 1 shows a schematic illustration of an electronic system according to one exemplary embodiment of the present invention.

FIG. 1 shows an electronic system 1 which has a first electronic module 2*a* (in this case: a first integrated circuit), a second electronic module 2*b* (in this case: a second integrated circuit), a third electronic module 2c (in this case: a third integrated circuit), a fourth electronic module 3 (in this case: a fourth integrated circuit, for example a multiplexer), as well as further electronic modules which are not illustrated here, and a clock production unit 8. All the electronic modules 2a, 2b, 2c, 3 as well as the clock production unit 8 are arranged on the same board (not illustrated).

In contrast to this, in an alternative exemplary embodiment which is not illustrated here, the electronic modules are arranged on different boards. Furthermore, a central board may be provided, which has one or more plug-in slots. The plug-in slots are each mechanically designed such that one board with an electronic module can be plugged in to each of them. In this exemplary embodiment, each electronic module may have a number of integrated circuits, which communicate with one another and with integrated circuits of other modules via one or more bus systems. A clock production unit corresponding to the above-mentioned clock production unit 8 then can be arranged, for example, on the central board, or on any of the other boards.

Referring once again to the exemplary embodiment shown in FIG. 1, the clock production unit 8 is connected via a first, central clock line 4a, via a second, central clock line 4b, and via a third, central clock line 4c to both the first and the other electronic modules 2a, 2b, 2c, 3. Furthermore, a first connecting line group 5a is provided, which includes n (in this case: n=16) individual connecting lines 9a, 9b, . . . 9p, via which the first electronic module 2a is connected to the fourth electronic module 3. In a corresponding way, the second and the third electronic modules 2b, 2c as well as the further modules which are not illustrated are each also connected to the fourth electronic module 3 via connecting line groups 5b, 5c, which likewise include n (in this case: n=16) individual lines. Depending on the signals received via the connecting lines in the individual connecting line groups 5a, 5b, 5c, the fourth electronic module 3 produces output signals, which are emitted on corresponding output lines in an output signal line group 6.

As will be explained in more detail in the following text, the system 1 according to the present invention has a first, a second, a third as well as further (not illustrated) reference signal lines 7a, 7b, 7c, via which the fourth electronic module 3 is connected to the other electronic modules 2a, 2b, 2c.

The clock production unit 8 emits on the first clock line 4a a clock signal T at a frequency $f_T$ of, for example, 2.5 GHz, and, corresponding to the number of bits/bytes contained in a frame, a frame clock signal TR on the third clock line 4c at a frequency $F_r$ of, for example, 8 kHz. Furthermore, the clock production unit 8 produces, on the second clock line 4b, a reference clock signal TREF at a frequency $f_{TREF}$ of, for example, $(n \times 8 + n) \times f_{TR}$, such as 1.152 MHz which, as will be explained further below, is used for clocking reference signals Ref1, Ref2, Refx which are emitted from the fourth electronic module 3 to the reference signal lines 7a, 7b, 7c.

The electronic modules 2a, 2b, 2c, 3 are designed using CMOS technology and are used, for example, to process a data signal which is received by an optical message network at a rate of, for example, 40 Gbit/s. In order to allow this (relatively high) processing speed, the received optical signal is split into a number of electrical subsignals, in this case: n=16, which are processed in parallel in the respective electronic modules 2a, 2b, 2c.

By way of example, subsignals which are processed by the first electronic module 2a are transmitted in the form of a parallel transmission signal S1 to the fourth electronic module 3 via the n=16 connecting lines 9a, 9b, . . . , 9p, as mentioned above, in the first connecting line group 5a. In a similar way, subsignals which are processed by the second and third electronic module 2b, 2c, respectively, are each transmitted in the form of parallel transmission signals S2, S3 to the fourth electronic module 3 via the n=16 connecting lines in the second and third connecting line groups 5b, 5c, respectively.

By way of example, FIG. 2 shows a timing diagram of the transmission signals emitted from the first electronic module 2a on the connecting lines 9a, 9b, . . . , 9p in the first connecting line group 5a. The transmission of a frame starts with a negative clock edge of the frame clock signal TR, and ends with the next negative frame clock signal edge. Each byte in a frame includes 8 bits, with each bit being transmitted starting with a negative edge, and ending with the next negative edge, of the clock signal T.

Referring once again to FIG. 1, the first, the second and the third module 2a, 2b, 2c each have a memory device 11. The first eight bits of the respective first byte transmitted via the respective connecting line 9a, 9b, . . . , 9p from the respective module 2a, 2b, 2c are in each case stored in this memory device 11, for each connecting line 9a,9b, . . . ,9p.

By way of example, FIG. 3 shows how the transmission signals sent by the first electronic module 2a on the connecting lines 9a, 9b, . . . , 9p in the first connecting line group 5a arrive at the fourth module 3 at respectively different times owing to the delay time differences, with respect to the frame clock TR. The delay time differences may be caused, for example, by different signal delay times on the connecting lines 9a, 9b, . . . , 9p, by different signal delay times in (not illustrated here) output circuits of the first module 2a, and by different signal delay times in (not illustrated here) input circuits of the fourth module 3.

As is shown in FIG. 3, the received transmission signals are each checked with respect to the times t0 in the fourth module 3. The checking times t0 each occur on a positive clock edge of the clock signal T. For each of the n=16 connecting lines 9a, 9b, . . . , 9p, the first eight bits received after the negative edge of the frame clock signal TR are stored in a memory device 10 which is provided, as shown in FIG. 1, in the fourth module 3 (in the example shown here, for instance as shown in FIG. 3, with respect to the first connecting line 9a, the fourth, fifth, sixth, seventh and eighth bits (annotated by "4", "5", "6", "7", "8" in the drawing) of the first byte, and the first three bits ("1", "2", "3") of the second byte, with respect to the second connecting line 9b the third, fourth, fifth, sixth, seventh and eighth bits ("3", "4", "5", "6", "7", "8") of the first byte, as well as the first two bits ("1", "2") of the second byte, etc.).

Figure 4:
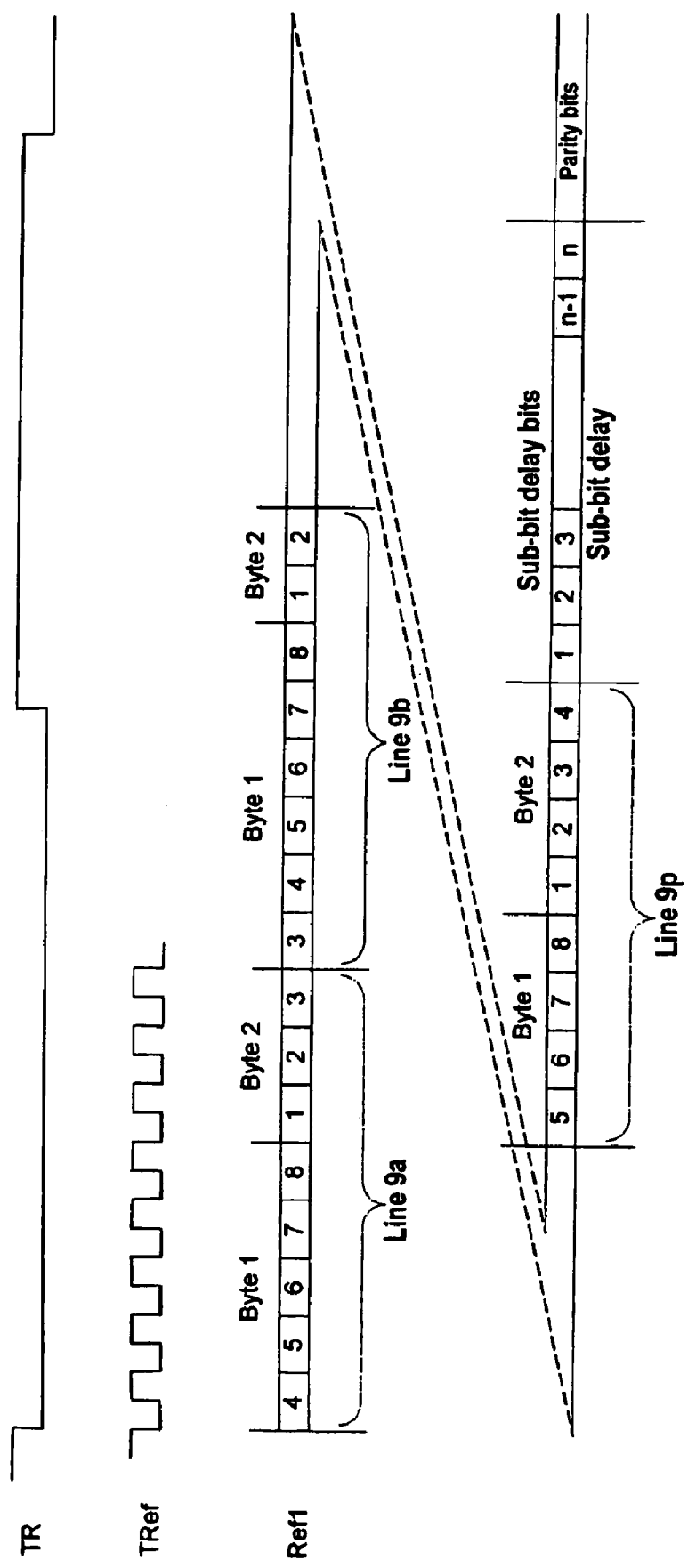
FIG. 4 shows a timing diagram of the reference signal received by the first electronic module, illustrated in FIG. 1, from the fourth electronic module, as well as the clock signals received by the first electronic module.

The stored bits are signaled back as a serial reference signal Ref1 via the reference signal line 7a to the first electronic module 2a, to be precise, as shown in FIG. 4, first of all the fourth, fifth, sixth, seventh and eighth bits ("4", "5", "6", "7", "8") of the first byte stored for the first connecting line 9a, and the first three bits ("1", "2", "3") of the second byte, followed by the bits which are stored for the second connecting line 9b, etc.

The bits stored in the memory device 11 are compared in the first module 2a, for each connecting line 9a, 9b, . . . , 9p with the bits received by the fourth module 3 for the corresponding connecting line 9a, 9b, . . . , 9p.

Figure 5:
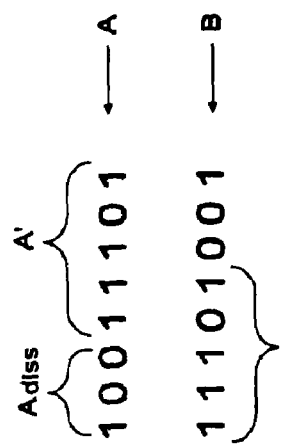
FIG. 5 shows a bit sequence which is sent by the first electronic module illustrated in FIG. 1 and is stored, and a bit sequence received by this module.

By way of example, FIG. 5 shows a bit sequence A, which is stored in the memory device 11 for the first connecting line 9a, as well as a bit sequence B, which is contained in the reference signal Ref1 for this connecting line 9a. The bits in a partial bit sequence B' which is located at the start of the bit sequence B are identical to a partial bit sequence A', which starts only after an initial bit sequence Adiss in the bit sequence A. The number of bits in the initial bit sequence Adiss (in this case: 3 bits) allows the total signal delay, caused by the connecting line 9a and by the corresponding output circuit and input circuit, respectively, of the first and fourth modules 2a, 3, to be determined with single-bit accuracy.

A corresponding total signal delay determination is carried out by the first module 2a for each of the n=16 connecting lines 9a, 9b, ..., 9p.

The insertion of bit-by-bit delays, determined specifically for each of the connecting lines 9a, 9b, ..., 9p (in this case: 5 bits for the first connecting line, 6 bits for the second connecting line, etc.) into the transmission signals emitted from the first module 2a makes it possible, as shown on the fourth module 3 in FIG. 6, to detect the same bits in the same byte in each case, for each connecting line 9a, 9b, ..., 9p, with respect to the checking times t0. This makes it possible to adjust the checking times t0 approximately.

Figure 7:
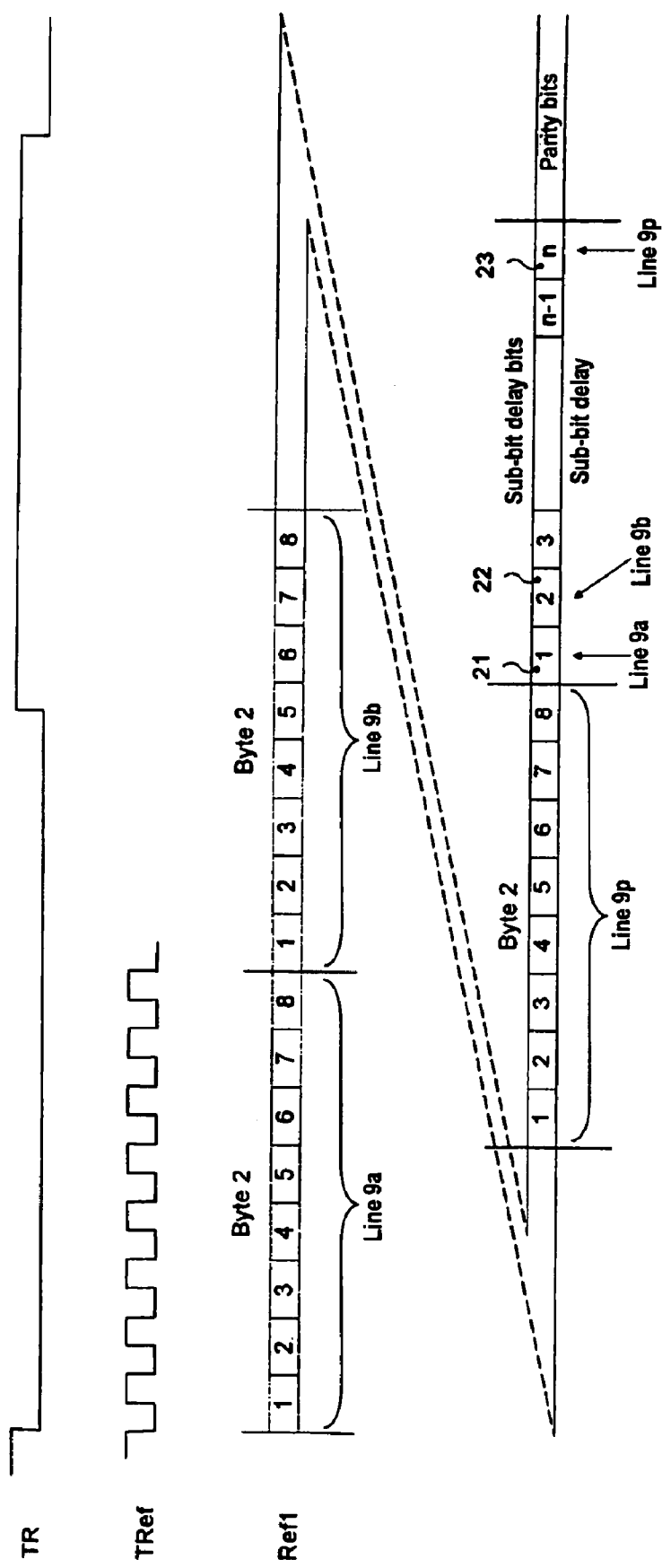
FIG. 7 shows a timing diagram of the reference signal received by the first electronic module, illustrated in FIG. 1, from the fourth electronic module after the delay to the bits in the transmission signals.

As FIG. 7 shows, the first eight bits of the respective second byte are in each case transmitted to the first electronic module 2a in the serial reference signal Ref1, via the reference signal line 7a, from the fourth electronic module 3, for each connecting line 9a, 9b, ..., 9p.

Figure 8:
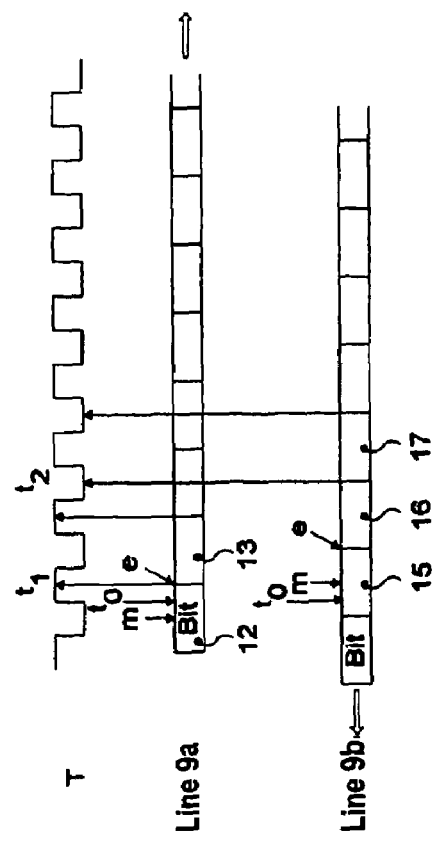
FIG. 8 shows a detailed illustration of the timing of the clock signal received by the fourth electronic module illustrated in FIG. 1, with respect to individual bits, received by the fourth module, before fine adjustment of the transmission signal delay.

Next, the transmission signal delay (or speeding up) is subjected to fine adjustment: as shown in FIG. 8, the checking times t0 (positive clock edge of the clock signal T) are generally not located precisely at the center of the respectively checked bit after the approximate adjustment as described above (for example, somewhat too late with respect to the bits 12, 13 received on the connecting line 9a, and somewhat too early with respect to the bits 15, 16, 17 received on the connecting line 9b).

In order to correct the timing of the sampling time to, a check is carried out in the fourth module 3 to determine whether the clock signal T is a logic "0" or a logic "1" at the times $t_1$, $t_2$ of the change between two successive bits 12, 13 or 15, 16, 17 (or at the time $t_1$ or $t_2$, respectively, of the bit end e of the respective bit 12 or 15, 16, respectively). If the clock signal T is a logic "1", as for the line 9a, at the bit changing time $t_1$, the sampling is being carried out too late. If, on the other hand, as for the line 9b, the clock signal T is a logic "0" at the bit changing time $t_2$, the sampling time to is too early.

Figure 10:
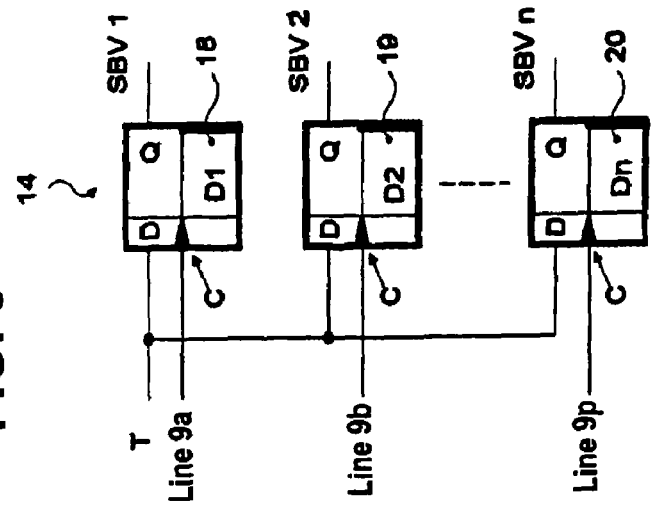
FIG. 10 shows a circuit arrangement for determining the timing of signal checking times with respect to individual bits received by the fourth module.

FIG. 10 shows a circuit arrangement 14 which is provided in the fourth module 3 and which is used to determine whether the clock signal T is a logic "0" or a logic "1", at the time of a bit change. The circuit arrangement 14 contains a number n=16 of edge-triggered D-flipflops 18, 19, 20 corresponding to the number n=16 of connecting lines 9a, 9b, ..., 9p from the first module 2a to the fourth module 3. Each D-flipflop 18, 19, 20 has a data input D, a clock input C, and a data output Q. Whenever the signal applied to the clock input C changes from logic "1" to logic "0", the signal which is applied to the data input D at this instant is transmitted to the data output Q, and is frozen until the next negative signal edge occurs at the clock input C.

The clock signal T is applied to each of the data inputs D of the n=16 D-flipflops 18, 19, 20. Furthermore, the transmission signal which is applied to the first connecting line 9a is supplied to the clock input C of the first D-flipflop 18, and the transmission signal which is applied to the connecting line 9b, 9p associated with the respective flipflop 19, 20 is supplied to the clock inputs C of the other D-flipflops 19, 20.

Accordingly, a sub-bit delay signal SBV1, SBV2, SBVn which is emitted at the data output Q of the respective D-flipflop 18, 19, 20 is a logic "0" when the clock signal T is a logic "0" at the respective bit changing time $t_1$, $t_2$ (sampling time t0 too early). If the clock signal T is a logic "1" at the respective bit changing time $t_1$, $t_2$ (sampling time t0 too late), the corresponding sub-bit delay signal SBV1, SBV2, SBVn is a logic "1".

Depending on whether the sub-bit delay signal SBV1, SBV2, SBVn which is associated with the respective connecting line 9a, 9b, ..., 9p is a logic "1" or a logic "0", a sub-bit delay bit 21, 22, 23 with the value "1" or "0" is inserted, as shown in FIG. 7, into the reference signal Ref1 for each connecting line 9a, 9b, ..., 9p, and is transmitted to the first module 2a.

The received sub-bit delay bits 21, 22, 23 are evaluated in the first module 2a. If the sub-bit delay bit 21, 22, 23 which is received for a specific connecting line 9a, 9b, ..., 9p is a logic "1", the associated transmission signal is "speeded up" (that is to say, it is passed somewhat earlier from the first module 2a to the corresponding connecting line 9a, 9b, ..., 9p). In contrast, the respective transmission signal is "delayed" (that is to say, it is passed somewhat later to the corresponding connection line 9a, 9b, ..., 9p), when the sub-bit delay bit 21, 22, 23 which is received for a specific connecting line 9a, 9b, ..., 9p is a logic "0".

Figure 11:
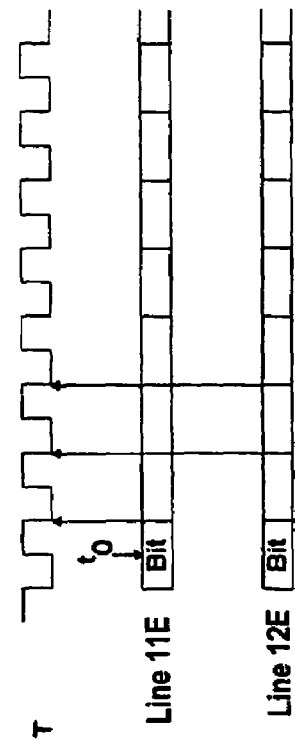
FIG. 11 shows a detailed illustration of the timing of the clock signal received by the fourth electronic module illustrated in FIG. 1, with respect to individual bits, received by the fourth module, after the fine adjustment of the transmission signal delay.

As such, as is shown in FIG. 9 and in the detail in FIG. 11, the checking time t0 in the fourth module 3 is located essentially centrally with respect to the bit that is in each case being checked.

As shown in FIGS. 4 and 7, eight parity bits, for example, also can be provided in the reference signal Ref1 for each connecting line 9a, 9b, , 9p, via which it is possible to determine, in the normal way, whether, and if so how many, faults have occurred during the transmission. If parity bits are used, the frequency $f_{TREF}$ of the reference clock signal TREF must be higher than when no parity bits are used (for example, $f_{TREF}=(2n\times 8+n)\times f_{TR}$, such as 2.176 MHz, instead of $f_{TREF}$ (n×8+n)×$f_{TR}$, for example 1.152 MHz).

The present invention makes it possible for the reference signal frequency fTREF to be considerably lower than the frequency fT at which data is transmitted by the first, second and third modules 2a, 2b, 2c to the fourth module 3. Furthermore, the relatively complex control circuits for delaying or speeding up the transmission signals can be provided in the (transmitting) modules 2a, 2b, 2c instead of in the (receiving) module 3.

Although the present invention has been described with reference to specific embodiments, those of skill in the art will recognize that changes may be made thereto without departing from the spirit and scope of the invention as set forth in the hereafter appended claims.

The invention claimed is:

1. An electronic system for compensating for delay time fluctuations, comprising:
  a first module comprising a memory device in which at least some bits of the data
  transmitted from the first module to a further module are stored;
  a connecting line, wherein the data is transmitted from the first module to the further module via the connecting line; and
  a reference signal line via which a reference signal is transmitted from the further module to the first module, wherein the reference signal is selected as a function of a timing of the data received by the further module via the connecting line from the first module, with respect to a clock signal received by the further module, and wherein the reference signal has a bit sequence corresponding to a bit sequence received by the further module via the connecting line from the first module wherein the transmission of the data by the first module is altered as a function of the reference signal received by the first module, the alteration being one of delaying and speeding up of the data transmission, and wherein an extent of the alteration of the transmission of data is determined based on a comparison of the bits stored in the memory device in the first module with the bit sequence of the reference signal transmitted by the further module to the first module.

2. An electronic system for compensating for delay time fluctuations as claimed in claim 1, further comprising at least one further connecting line via which the first module transmits further data, in a parallel manner, to the further module.

3. An electronic system for compensating for delay time fluctuations as claimed in claim 2, wherein the reference signal is chosen as a function of the timing of the data received by the further module via the connecting line and the further data received by the further module via the further connecting line, with respect to the clock signal received by the further module.

4. An electronic system for compensating for delay time fluctuations as claimed in claim 3, wherein the reference signal has a further bit sequence, which corresponds to a bit sequence received by the further module via the further connecting line from the first module.

5. An electronic system for compensating for delay time fluctuations as claimed in claim 4, wherein the transmission of further data via the further connecting line is altered by the first module as a function of the further bit sequence, the alteration being one of delaying and speeding up the transmission.

6. An electronic system for compensating for delay time fluctuations as claimed in claim 1, wherein alteration of the transmission of the data by the first module is chosen as a function of the timing of individual bit, received by the further module, with respect to the clock signal received by the further module.

7. An electronic system for compensating for delay time fluctuations as claimed in claim 6, wherein the reference signal has at least one bit which identifies whether the individual bit received by the further module has been checked with respect to a time before or after a bit center of the individual bit.

8. An electronic system for compensating for delay time fluctuations as claimed in claim 7, wherein the individual bit is checked with respect to times defined by the clock signal.

9. An electronic system for compensating for delay time fluctuations as claimed in claim 7, wherein a logic state of the clock signal at a bit end of the individual bit is determined in order to determine whether the individual bit has been checked with respect to the time before or after the bit center.

10. An electronic system for compensating for delay time fluctuations as claimed in claim 1, wherein the reference signal also contains parity bits.

11. An electronic system for compensating for delay time fluctuations as claimed in claim 1, wherein at least one of the first module and the further module includes an integrated circuit.

12. An electronic system for compensating for delay time fluctuations as claimed in claim 11, wherein the integrated circuit uses CMOS technology.

13. An electronic system for compensating for delay time fluctuations as claimed in claim 11, wherein the integrated circuit of the further module uses a faster processing speed than the integrated circuit in the first module.

14. An electronic system for compensating for delay time fluctuations as claimed in claim 1, wherein the first module and the further module are arranged on a same board.

15. An electronic system for compensating for delay time fluctuations as claimed in claim 14, wherein the first module and the further module are arranged on a same microchip.

16. An electronic system for compensating for delay time fluctuations as claimed in claim 1, wherein the first module and the further module are arranged on different boards.

17. A method for time control of data transmission from a first module to a further module, the method comprising the steps of:
    transmitting data from the first module to the further module via a connecting line;
    transmitting a reference signal from the further module to the first module, wherein the reference signal is selected as a function of a timing of the data received by the further module via the connecting line from the first module, with respect to a clock signal received by the further module; and
    delaying or speeding up the transmission of the data by the first module as a function of the reference signal received by the first module, wherein an extent of the delaying or speeding up of the transmission of data is determined based on a comparison of the bits stored in a memory device in the first module with a bit sequence of the reference signal transmitted by the further module to the first module.

18. A method for time control of data transmission from a first module to a further module as claimed in claim 17, wherein the reference signal has a bit sequence corresponding to a bit sequence received by the further module via the connecting line from the first module.

* * * * *